US012549979B2

(12) United States Patent
Kwon et al.

(10) Patent No.: US 12,549,979 B2
(45) Date of Patent: Feb. 10, 2026

(54) METHOD AND APPARATUS FOR ADAPTIVE MODULATION AND CODING (AMC) OF LINK ADAPTATION USING CHANNEL ORTHOGONALITY ANALYSIS IN WIRELESS MIMO-OFDM COMMUNICATION SYSTEMS

(71) Applicant: Senscomm Semiconductor Co., Ltd., Suzhou (CN)

(72) Inventors: Kyung Hoon Kwon, Seoul (KR); Seung Hyeok Ahn, Laguna Hills, CA (US); Young Hwan Kang, Suzhou (CN); Seung Ho Choo, Suzhou (CN); Jungchul Shin, Suzhou (CN); Daehong Kim, Laguna Hills, CA (US)

(73) Assignee: Senscomm Semiconductor Co., Ltd., Suzhou (CN)

( * ) Notice: Subject to any disclaimer, the term of this patent is extended or adjusted under 35 U.S.C. 154(b) by 497 days.

(21) Appl. No.: 18/296,314

(22) Filed: Apr. 5, 2023

(65) Prior Publication Data

US 2024/0137790 A1  Apr. 25, 2024
US 2024/0236728 A9  Jul. 11, 2024

Related U.S. Application Data

(60) Provisional application No. 63/482,774, filed on Feb. 1, 2023, provisional application No. 63/380,552, filed on Oct. 21, 2022.

(30) Foreign Application Priority Data

Mar. 28, 2023  (CN) .......................... 202310311441.2

(51) Int. Cl.
*H04W 24/08* (2009.01)
*H04L 1/00* (2006.01)

(52) U.S. Cl.
CPC ........... *H04W 24/08* (2013.01); *H04L 1/0003* (2013.01); *H04L 1/0009* (2013.01)

(58) Field of Classification Search
CPC .. H04B 7/0417; H04B 17/336; H04B 17/345; H04B 17/391; H04L 1/0003;
(Continued)

(56) References Cited

U.S. PATENT DOCUMENTS 8,537,923 B2 * 9/2013 Lee .................. H04L 25/03171
375/267
8,553,818 B2 * 10/2013 Chun .................. H04L 25/0202
375/130

(Continued)

OTHER PUBLICATIONS

Fernando Andres Quinroga, Link-to-System Interfaces for System Level Simulations Featuring Hybrid ARQ, Master's Thesis, Technical University of Munich, 85 pages, Dec. 1, 2008.*
Zheng et al., Link Performance Abstraction for ML Receivers based on RBIR Metrics, IEEE 802.16 Broadband Wireless Access Working Group, 23 pages, Dec. 15, 2007.*
Porat, R et al. "11ax Evaluation Methodology." IEEE P802.11 Wireless LANs. Jan. 21, 2016.
Liu, J et al. "PHY Abstraction for and IEEE 11ax PHY System Simulation and Integrated System Level Simulation." IEEE 802.11-14/0585r5. Apr. 8, 2014.
(Continued)

*Primary Examiner* — Frank Duong
(74) *Attorney, Agent, or Firm* — BROADVIEW IP LAW, PC

(57) ABSTRACT

The present disclosure discloses systems and methods of calculating a near-maximum likelihood detection (MLD) performance capability signal to interference plus noise ratio (SINR) according to instructions stored in non-transitory computer readable memory that when executed by a processor of a multiple-input, multiple output orthogonal frequency-division multiplexing (MIMO-OFDM) wireless communications receiver device cause the processor to perform operations including the processor acquiring $H_i$ and noise variance $\sigma_n^2$ for each subcarrier of a set of subcarriers between a MIMO-OFDM wireless communications transmitter device and the wireless communications receiver device, computing an average received bit mutual informa- (Continued)

tion rate (RBIR) over all subcarriers, converting the average RBIR to an effective SINR; and selecting a modulation coding scheme (MCS).

20 Claims, 10 Drawing Sheets

(58) Field of Classification Search
CPC ... H04L 1/0009; H04L 1/0015; H04L 1/0016; H04L 5/0023; H04L 5/006; H04L 5/1438; H04L 5/1453; H04L 25/0202; H04L 27/0008; H04L 27/0012; H04L 27/362; H04W 24/08
See application file for complete search history.

(56) References Cited

U.S. PATENT DOCUMENTS

| | | | |
|---|---|---|---|
| 8,750,359 B2* | 6/2014 | Medles | H04B 7/0417 |
| | | | 375/267 |
| 2010/0064185 A1* | 3/2010 | Zheng | H04L 1/203 |
| | | | 714/704 |

OTHER PUBLICATIONS

Nortel. "Link-to-System Mapping for 2x2 SM Mode with MLD Receiver." R1-051429. 3GPP TSG-RAN1 Meeting #43. Seoul, Korea, Nov. 7-11, 2005.

* cited by examiner

1000

| SNR in dB | RBIR values | | | | | | |
|---|---|---|---|---|---|---|---|
| | BPSK | QPSK | 16QAM | 64QAM | 256QAM | 1024QAM | 4096QAM |
| -20 | 0.0146 | 0.0142 | 0.0144 | 0.0144 | 0.0144 | 0.0143 | 0.0144 |
| -18 | 0.0230 | 0.0231 | 0.0226 | 0.0228 | 0.0227 | 0.0228 | 0.0227 |
| -16 | 0.0351 | 0.0359 | 0.0359 | 0.0358 | 0.0358 | 0.0357 | 0.0358 |
| -14 | 0.0546 | 0.0568 | 0.0560 | 0.0565 | 0.0563 | 0.0563 | 0.0563 |
| -12 | 0.0874 | 0.0874 | 0.0881 | 0.0886 | 0.0884 | 0.0881 | 0.0883 |
| -10 | 0.1296 | 0.1366 | 0.1377 | 0.1376 | 0.1376 | 0.1374 | 0.1375 |
| -8 | 0.1969 | 0.2126 | 0.2122 | 0.2122 | 0.2122 | 0.2123 | 0.2122 |
| -6 | 0.2898 | 0.3238 | 0.3227 | 0.3239 | 0.3229 | 0.3228 | 0.3232 |
| -4 | 0.4148 | 0.4840 | 0.4843 | 0.4828 | 0.4829 | 0.4830 | 0.4829 |
| -2 | 0.5672 | 0.6978 | 0.7029 | 0.7035 | 0.7031 | 0.7035 | 0.7033 |
| 0 | 0.7204 | 0.9699 | 0.9912 | 0.9921 | 0.9924 | 0.9921 | 0.9921 |
| 2 | 0.8592 | 1.2833 | 1.3428 | 1.3484 | 1.3497 | 1.3492 | 1.3499 |
| 4 | 0.9510 | 1.5879 | 1.7511 | 1.7665 | 1.7676 | 1.7687 | 1.7688 |
| 6 | 0.9904 | 1.8236 | 2.2036 | 2.2312 | 2.2369 | 2.2379 | 2.2383 |
| 8 | 0.9991 | 1.9525 | 2.6836 | 2.7357 | 2.7444 | 2.7468 | 2.7471 |
| 10 | 1.0000 | 1.9938 | 3.1640 | 3.2680 | 3.2839 | 3.2878 | 3.2883 |
| 12 | 1.0000 | 1.9996 | 3.5801 | 3.8250 | 3.8482 | 3.8538 | 3.8545 |
| 14 | 1.0000 | 2.0000 | 3.8534 | 4.3946 | 4.4317 | 4.4392 | 4.4410 |
| 16 | 1.0000 | 2.0000 | 3.9704 | 4.9612 | 5.0302 | 5.0408 | 5.0438 |
| 18 | 1.0000 | 2.0000 | 3.9976 | 5.4601 | 5.6400 | 5.6553 | 5.6586 |
| 20 | 1.0000 | 2.0000 | 4.0000 | 5.8017 | 6.2574 | 6.2792 | 6.2836 |
| 22 | 1.0000 | 2.0000 | 4.0000 | 5.9572 | 6.8657 | 6.9105 | 6.9165 |
| 24 | 1.0000 | 2.0000 | 4.0000 | 5.9960 | 7.4042 | 7.5474 | 7.5557 |
| 26 | 1.0000 | 2.0000 | 4.0000 | 5.9999 | 7.7775 | 8.1876 | 8.1998 |
| 28 | 1.0000 | 2.0000 | 4.0000 | 6.0000 | 7.9511 | 8.8176 | 8.8478 |
| 30 | 1.0000 | 2.0000 | 4.0000 | 6.0000 | 7.9952 | 9.3770 | 9.4984 |
| 32 | 1.0000 | 2.0000 | 4.0000 | 6.0000 | 7.9999 | 9.7656 | 10.1504 |
| 34 | 1.0000 | 2.0000 | 4.0000 | 6.0000 | 8.0000 | 9.9479 | 10.7915 |
| 36 | 1.0000 | 2.0000 | 4.0000 | 6.0000 | 8.0000 | 9.9949 | 11.3606 |
| 38 | 1.0000 | 2.0000 | 4.0000 | 6.0000 | 8.0000 | 9.9999 | 11.7583 |
| 40 | 1.0000 | 2.0000 | 4.0000 | 6.0000 | 8.0000 | 10.0000 | 11.9459 |
| 42 | 1.0000 | 2.0000 | 4.0000 | 6.0000 | 8.0000 | 10.0000 | 11.9946 |
| 44 | 1.0000 | 2.0000 | 4.0000 | 6.0000 | 8.0000 | 10.0000 | 11.9998 |
| 46 | 1.0000 | 2.0000 | 4.0000 | 6.0000 | 8.0000 | 10.0000 | 12.0000 |

METHOD AND APPARATUS FOR ADAPTIVE MODULATION AND CODING (AMC) OF LINK ADAPTATION USING CHANNEL ORTHOGONALITY ANALYSIS IN WIRELESS MIMO-OFDM COMMUNICATION SYSTEMS

CROSS-REFERENCE TO RELATED APPLICATIONS

This application claims benefit of U.S. Provisional Application No. 63/482,774 filed on Feb. 1, 2023, and U.S. Provisional Application No. 63/380,552 filed on Oct. 21, 2022, in the United States Patent and Trademark Office, and China Patent Application No. 202310311441.2 filed on Mar. 28, 2023, in the China National Intellectual Property Administration, the entire contents of which are hereby incorporated by reference.

FIELD

The present disclosure relates to the communication technology, and in particular, to wireless station devices and methods for wireless communication performed by wireless station devices. Embodiments disclosed herein include using a link adaptation of an adaptive modulation and coding (AMC) scheme to analyze a channel orthogonality for SISO or MIMO wireless LAN systems and provides a near maximum likelihood detection (MLD) performance capability through upper and lower bounds using MMSE detector(s) and genie-aided interference free (IF) detector(s). An effective SINR (Signal to Interference plus Noise Ratio) can be calculated through the relation between the upper and lower bounds and channel quality can be estimated using the effective SINR. MCS selection can be determined using the estimated channel quality.

BACKGROUND

Orthogonal Frequency Division Multiplexing (OFDM) as a multi-carrier modulation method, one of many wireless communication technologies for supporting high-speed mobile communication, is used in many fields such as 3GPP LTE ($3^{rd}$ Generation Partnership Project Long-Term Evolution), 5G NR (Fifth Generation New Radio), WLAN (wireless local area network), and others. OFDM operably converts a serial input-symbol vector into a parallel vector, and the converted parallel vector is modulated to subcarriers with mutual orthogonality. In addition, OFDM is designed for high-speed packetized data transmission that can be obtained by efficiently using transmission bandwidth or eliminating inter-symbol interference caused by frequency selective fading channels. Packet by packet transmission is possible through frequency selective channels without using an equalizer.

Multi-input Multi-output (MIMO) systems can achieve considerable throughput gain as compared to Single-input Single-output (SISO) systems due to the ability to transmit multiple independent data streams. As such, recent wireless communication systems are most commonly in the form of MIMO-OFDM, a combination of MIMO and OFDM technologies.

MIMO-OFDM techniques are incorporated and used in many communication standards but are especially widely implemented in wireless local area networks (WLAN). WLAN standards issued by the Institute of Electrical and Electronics Engineers (IEEE) are commonly known under the 802.11 designation and are specified as a set of media access control (MAC) and physical layer (PHY) protocols. OFDM was first adopted in 802.11a, published around 1999, and MIMO-OFDM was adopted in 802.11n, published around 2008. High-order modulation (e.g. up to 256-QAM (quadrature amplitude modulation)) and multi-user (MU) MIMO technologies were introduced in the 802.11ac standard, published around 2014, and the latest wireless communication technologies such as 1024-QAM, Orthogonal Frequency Division Multiple Access (OFDMA), and uplink (UL) MU techniques were applied in the 802.11ax, published around 2020. 802.11be and other future WLAN standards have standardized many of the latest communication technology techniques, including the use of 320 MHz bandwidth, 16 spatial streams, multiple Access Point (AP) Coordination and others.

For time-varying channels, adaptive modulation and coding (AMC) is a wireless communication technology that improves link performance by adjusting a number of variables, including transmission power level, channel coding rate, and modulation order using current channel state information (CSI). By adjusting a data transmission rate according to the channel state, data can be efficiently transmitted over the channel and throughput can be increased. As such, accurate preemptive estimation of performance is required before wireless transmission occurs and feedback from and about a given channel environment at the receiver side is needed.

For technology that combines and integrates an AMC scheme in a MIMO system, overall performance will depend on demodulation architecture at the receiver side. As contemplated in some embodiments herein, when employing linear equalizers (e.g. minimum mean square error (MMSE) and zero-forcing (ZF), spatially multiplexed multi-stream signals) multi-stream signals can be transmitted to a certain single user MIMO (SU-MIMO). Multi-user MIMO (MU-MIMO) can be converted into multiple SISO antenna signals using linear equalizers' equations. Even if multiple signals are transmitted at the same time, it is possible to recover each signal of the multiple signals using individual estimation. In other words, if inter-symbol interference is mitigated using a linear equalizer, the estimation method of a SISO antenna system can be employed since a MIMO antenna system is considered equivalent to a multiple SISO antenna system. In the case of MIMO systems with linear receivers, such as MMSE and/or ZF receivers, a post-processed SINR could be readily provided by an output SINR. However, for a maximum-likelihood (ML) receiver, calculating the post-processed SINR is not as straightforward since ML-based demodulation is a non-linear process. This is true despite the fact that using a ML receiver for MIMO systems provides optimal performance. For optimal data estimation of the MIMO system, it can be useful to employ maximum likelihood detection (MLD) as a non-linear equalizer. MLD provides better performance than linear equalizers through its simultaneous estimating and transmitted data. Unfortunately, a problem arises in situations where AMC cannot be applied for use in a single antenna system, since MLD performs estimating and data transmission simultaneously. Yet another problem arises due to the fact that MLD is non-linear, in that the complexity of MLD increases exponentially as a modulation order increases.

Accordingly, there is a need for systems and methods that efficiently apply AMC in MIMO systems where the use of MLD is required.

The description set forth in the background section should not be assumed to be prior art merely because it is set forth in the background section. The background section may describe aspects, features, advantages or embodiments of the present disclosure.

SUMMARY

Some objectives of the present disclosure are to provide systems, methods, and apparatuses that enable practical application of the so-called brilliant decision rule for AMC configurations in real-world constructs subject to a time-varying channel and unavoidable impairments that arise due to MIMO system implementation. In practice, both SISO systems and MIMO systems suffer from performance loss due to channel estimator error caused by implementation issues, channel interference, radio frequency (RF) issues, and others. Due to inherent channel estimation error, expected data loss that may occur at or in a receiver unit should be predicted to the highest degree possible and considered in design of the receiver unit to mitigate such loss to the greatest extent practical. Embodiments herein provide calibration methods that strive to account for loss of channel integrity caused by estimation errors. These embodiments also contemplate that receiver algorithm(s) are employed with near-MLD performance at MIMO systems so that effective AMC and accurate channel quality estimation can be effectively applied on MIMO systems.

Objectives of the present disclosure are not limited to the objects described above, and other objectives and advantages of the present disclosure not described may be understood by the following description and will be more clearly understood by the embodiments of the present disclosure. In addition, it will be apparent that the objects and advantages of the present disclosure may be implemented by the means and combinations thereof indicated in the claims.

According to some aspects of the present disclosure, mathematical algorithm(s) with near-MLD performance are implemented on MIMO receiver(s) by calibrating channel estimation error and calculation processes of post-processed signal-to-noise ratio (SNR) and effective SINR. Methods of calculating calibration factors as methods of compensation for channel estimation loss on SISO systems are provided. Additionally, methods of calculating effective SINR with near-MLD performance are defined using an upper and lower bound through analysis of channel orthogonality ratios. Decision rules of modulation coding scheme (MCS) levels for AMC schemes exploiting estimated channel quality information are provided as proposed methods of calculating an effective SINR.

Among various methods of estimating channel quality for AMC schemes, predicting link performance based on packet error rate (PER) is a well-known approach and is suitable to reduce the complexity and improve the accuracy of estimating actual link performance. A link performance predictor refers to PER performance information on additive white Gaussian noise (AWGN) channels. The link performance predictor compares the channel qualities between the performance of AWGN and that of estimated actual channel conditions. For this approach, computing methods that convert each subcarrier-SNR to effective SNR on the Orthogonal Frequency Division Multiplex (OFDM) link layer are needed. Two representative approaches that link performance prediction are 1) Effective Exponential SINR Metric (EESM) and 2) Received Bit mutual Information Rate (RBIR).

One of the disadvantages of employing EESM algorithms is that a scalar normalization parameter ($\beta$) calculation is required for each MCS level and for various channel conditions. The parameter ($\beta$) of the EESM varies at each MCS level and also depends on characteristics of each channel. Thus, EESM algorithms require various parameter ($\beta$) values for all scenarios. On the other hand, RBIR algorithms are used in methods for mapping to an effective SINR using mutual information of transmitted symbol. Since symbol-level mutual information is less dependent on channel characteristics than EESM, estimation of an accurate information rate can be accomplished through the symbol-level mutual information. As such, the innovation disclosed herein employs RBIR algorithms to provide the most accurate channel quality estimation possible.

According to some aspects of the present disclosure, there is provided a wireless station device. The wireless station device includes a transceiver configured to receive a signal from another station device; and a processor operably coupled to the transceiver, the processor configured to: acquire a channel estimation from the received signal; calculate a first signal to interference plus noise ratio (SINR) based on the channel estimation; calculate a second SINR based on the channel estimation; calculate a third SINR based on the first SINR and the second SINR; calculate a received bit mutual information rate (RBIR) based on the third SINR; and select a modulation and coding scheme (MCS) based on the RBIRi and wherein the transceiver is further configured to transmit to the another station device, the selected MCS.

According to some aspects of the present disclosure, there is provided a method for wireless communication performed by a wireless station device. The method includes receiving a signal from another station device; acquiring a channel estimation from the received signal; calculating a first signal to interference plus noise ratio (SINR) based on the channel estimation; calculating a second SINR based on the channel estimation; calculating a third SINR based on the first SINR and the second SINR; calculating a received bit mutual information rate (RBIR) based on the third SINR; and selecting a modulation and coding scheme (MCS) based on the RBIRi and transmitting to the another station device, the selected MCS.

Technical solutions of the present disclosure are not limited to the abovementioned solutions, and solutions that are not mentioned will be clearly understood by those skilled in the art to which the present disclosure pertains from the present specification and the accompanying drawings.

BRIEF DESCRIPTION OF THE DRAWINGS

Aspects, features, and advantages of specific embodiments of the present disclosure will become more apparent from the following description with reference to the accompanying drawings.

DETAILED DESCRIPTION

Figure 1:
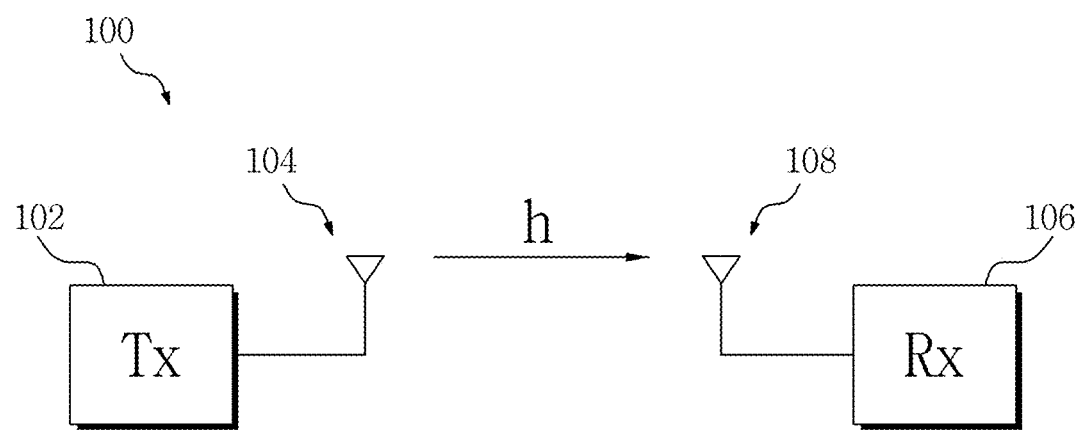
FIG. 1 is a block diagram illustrating a 1 by 1 SISO channel model in accordance with some embodiments of the present disclosure.

Terms used in the present specification will be briefly described, and then the present disclosure will be described in detail.

Unless defined otherwise, all technical and scientific terms used herein have the same meaning as commonly understood by one of ordinary skill in the art to which this invention belongs. It is noted that the use of any and all examples, or example terms, provided herein is intended merely to better illuminate the invention and is not a limitation on the scope of the invention unless otherwise specified. General terms that are currently widely used are selected as terms used in embodiments of the present disclosure in consideration of functions in the present disclosure, but may be changed depending on the intention of those skilled in the art or a judicial precedent, the emergence of a new technique, and the like. In addition, in a specific case, terms arbitrarily chosen by an applicant may be used. In this case, the meaning of such terms will be mentioned in detail in a corresponding description portion of the present disclosure. Therefore, the terms used in the present disclosure should be defined on the basis of the meaning of the terms and the contents throughout the present disclosure rather than simple names of the terms.

The present disclosure will now be described in further detail with reference to the accompanying drawings, in which preferred embodiments of the invention(s) are shown. The invention(s) may, however, be embodied in different forms and should not be construed as limited to the embodiments set forth herein. Rather, these embodiments are provided so that this disclosure will be thorough and complete, and will fully convey the scope of the invention(s) to those skilled in the art. The same reference numbers indicate the same components throughout the specification. In the attached figures, the thickness of layers and regions may be exaggerated for clarity. The elements in the figures are not necessarily to scale, emphasis instead being placed upon illustrating the principles of the embodiments. Moreover, all illustrations are intended to convey concepts, where relative sizes, shapes and other detailed attributes may be illustrated schematically rather than literally or precisely.

It will be understood that when an element or layer is referred to as being "connected to" or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when an element or layer is referred to as being "on" another element or layer or substrate, it can be directly on the other element or layer or substrate, or intervening elements or layers may also be present. In contrast, when an element or layer is referred to as being "directly on" another element or layer, there are no intervening elements or layers present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "module" or "unit" herein refers to a software or hardware component, and a "module" or "unit" performs certain roles. The meaning of "module" or "unit" is not limited strictly to hardware or software. The "module" or "unit" may be configured within an addressable non-transitory storage medium or configured to reproduce one or more processors. As such, a "module" or "unit" may include components such as software components, object-oriented software components, class components, task components, or others and at least one process, function, attribute, procedure, subroutine, program code segment, driver, firmware, micro-code, circuit, data, database, data structure, table, array, variable, or others. Functions provided by components and "modules" or "units" may be divided or combined into smaller or larger "modules" or "units."

In some embodiments, a "module" or "unit" may be implemented as a processor and memory. The "processor" can be broadly interpreted to encompass a general purpose processor, a central processing unknit (CPU), a microprocessor, a digital signal processor (DSP), a controller, a microcontroller, a state machine, or others. In some embodiments a "processor" may refer to an application specific integrated circuit (ASIC), a programmable logic device (PLD), a field programmable gate array (FPGA), and others. A "processor" may include a combination of processing devices in various configurations. "Memory" can include an electronic component that is capable of storing electronic information such as a processor readable medium. "Memory" can be a random access memory (RAM), read only memory (ROM), non-volatile random access memory (NVRAM), programmable read only memory (PROM), erasable programmable read only memory (EPROM), electronically erasable PROM (EEPROM), flash memory, magnetic data storage, optical data storage, registers, and others. The memory and processor are in electronic communication and the processor can read information and/or data from the memory and/or write information and/or data to the memory. Memory integrated with a processor is in electronic communication with the processor.

Calibrating channel estimation error and calculating an effective SINR to provide better data transmission characteristics according to some embodiments of the present disclosure will be described with reference to FIGS. 1 to 9.

FIG. 1 is a block diagram 100 illustrating a 1 by 1 SISO channel model in accordance with some embodiments of the present disclosure. As shown in the example embodiment, a transmitter unit Tx 102 can include at least one antenna 104. Likewise, a receiver unit Rx 106 can include at least one antenna 108. Signals including data can be wirelessly transmitted from antenna 104 via a wireless transmission channel and received at antenna 108. The wireless transmission channel can have a channel transfer coefficient h.

Figure 2:
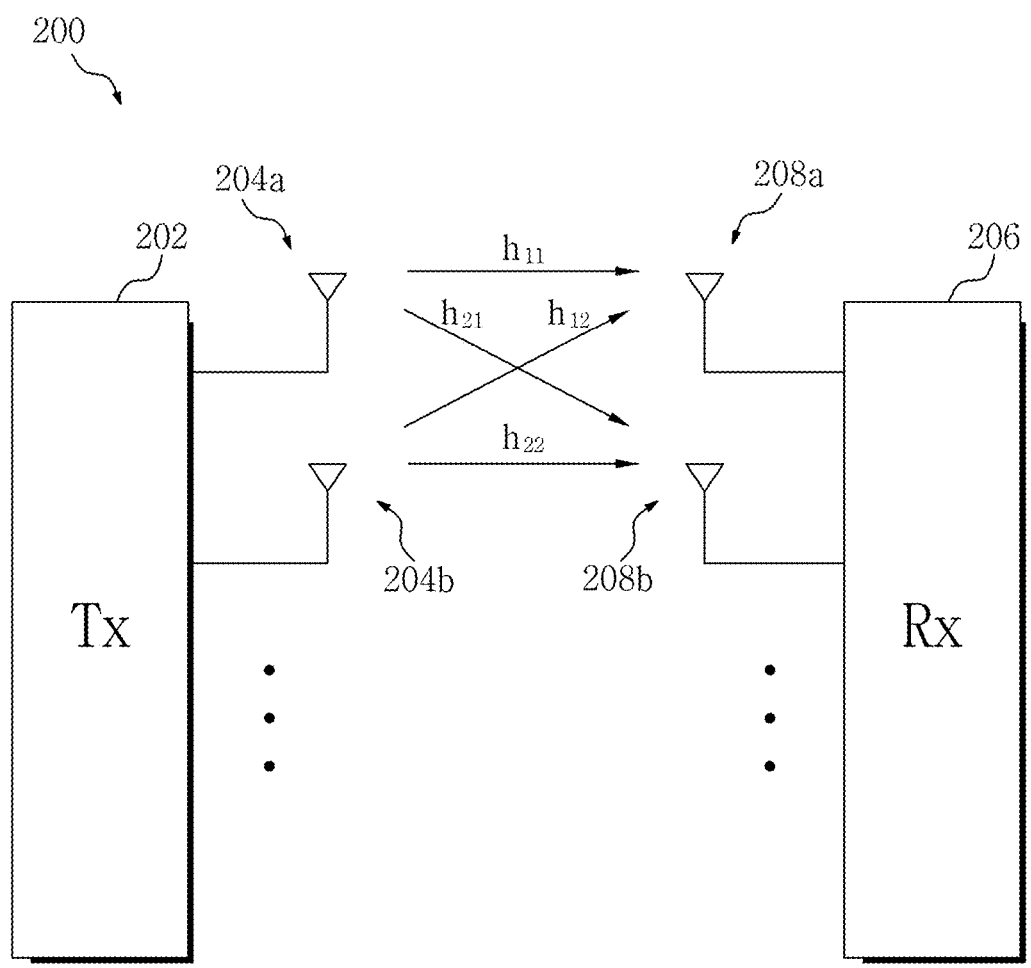
FIG. 2 is a block diagram illustrating a 2 by 2 MIMO channel model in accordance with some embodiments of the present disclosure.

FIG. 2 is a block diagram 200 illustrating a 2 by 2 MIMO channel model in accordance with some embodiments of the present disclosure. As shown in the example embodiment, a transmitter unit Tx 202 can include at least one antenna (e.g. two transmitting antennas are shown, first antenna 204a and second antenna 204b). Likewise, a receiver unit Rx 206 can include at least one antenna (e.g. two receiving antennas are shown, first antenna 208 and second antenna 208b). Signals including data can be wirelessly transmitted from antennas 204a, 204b via at least one wireless transmission channel and received at antenna 208a, 208b. Each of the at least one wireless transmission channel(s) can have a channel transfer coefficient $h_{ij}$. As shown, a first channel between antenna 204a and antenna 208a can have a channel transfer coefficient $h_{11}$. A second channel between antenna 204a and antenna 208b can have a channel transfer coefficient $h_{21}$. A third channel between antenna 204b and antenna 208a can have a channel transfer coefficient $h_{12}$. A fourth channel between antenna 204b and antenna 208b can have a channel transfer coefficient $h_{22}$.

Figure 3:
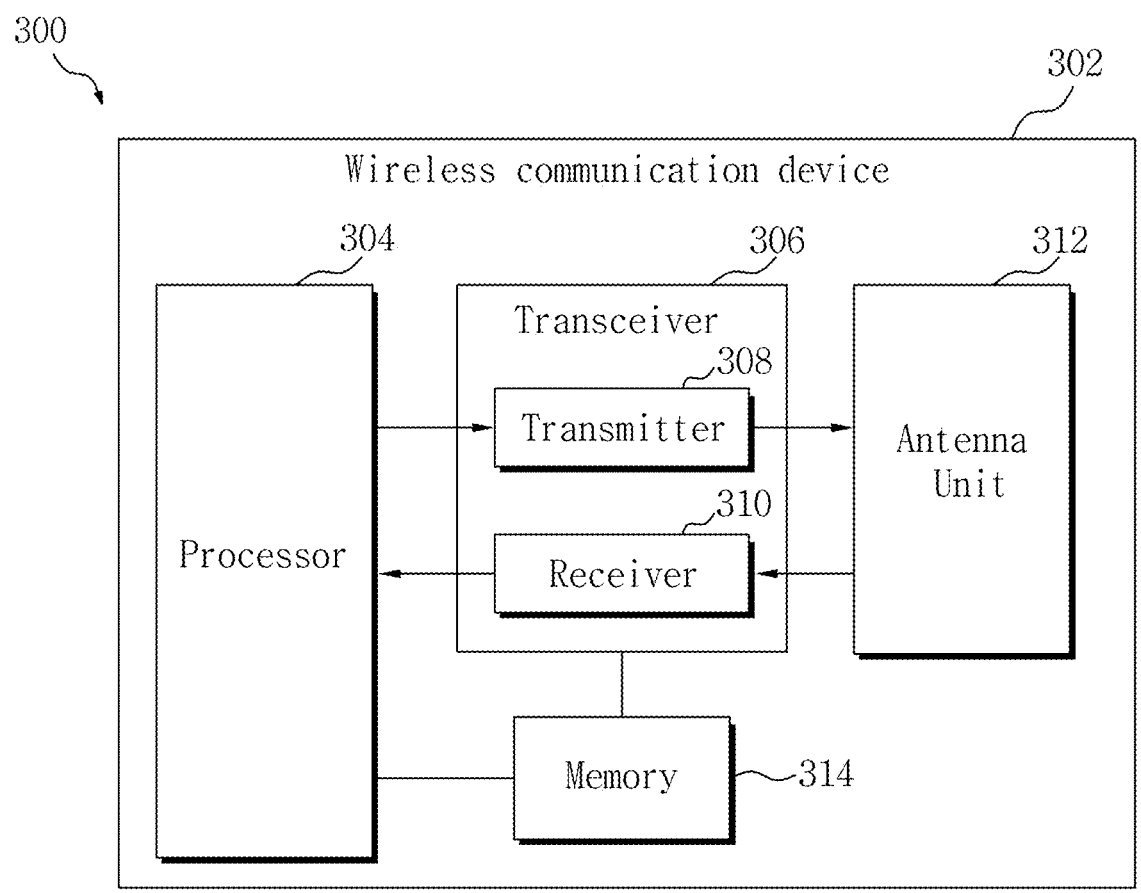
FIG. 3 is a block diagram illustrating a wireless communication device in accordance with some embodiments of the present disclosure.

FIG. 3 is a block diagram 300 illustrating a wireless communication device 302 in accordance with some embodiments of the present disclosure. As shown in the example embodiment, a wireless communication device 302 can include at least one processor 304 that is operable to perform operations that can be stored in at least one non-transitory memory such as memory 314. As such, processor 304 and memory 314 are coupled and processor 304 may also store information and/or data in memory 314. Processor 304 can control or use at least one transceiver 306 to send and/or receive signals that include data via antenna unit 312, which can include at least one antenna. Transceiver 306 can include at least one transmitter 308 and at least one receiver 310. In some embodiments transceiver 306 is coupled directly with memory 314. As shown, processor 304 can send data to transmitter 308 which is then sent to antenna unit 312 for transmission via a wireless channel. In various embodiments antenna unit 312 can receive data via a wireless channel that is sent to receiver 310 and which can then be sent to or accessed by processor 304. In various embodiments data to be sent and/or data received from at least one wireless channel can be stored in short term memory and/or buffers while awaiting processing. Components in the wireless communication device 302 can be implemented on circuitry.

In various embodiments, processor 304 can be a processor performing operations implemented by hardware (e.g. gates) or a general or specialized processor performing operations according to instructions stored in memory.

Although not shown in FIG. 3, those in the art will understand that at least one power source will provide power for wireless communication device 302 and backup and/or redundant power sources can be implemented in various embodiments. Furthermore, those in the art will understand that various interfaces can be included with and/or coupled to wireless communication device 302 that may include status indicator(s) such as light emitting diodes (LEDs), user interface screen(s) that can be touchscreens, buttons, and/or others that allow humans to interface with wireless communication device 302. Likewise, any number of machine interfaces such as plug(s), jack(s), or others may also be included that allow for data transfer and/or control.

Calibration Factor of RBIR Mapping for SISO/MIMO System

A received signal over subcarrier k after a Fast Fourier Transform (FFT) demodulation operation on $N_t$ by $N_r$ in a MIMO-OFDM system is defined as:

$$y_k = H_k s_k + w_k \qquad (1)$$

where:
$y_k$ is $N_r \times 1$ for a received vector;
$H_k = [h_1 \ldots h_{N_t}] \in \mathbb{C}^{N_r \times N_t}$ is $N_r \times N_t$ for a Rayleigh fading MIMO channel matrix whose entries have an independent and identically distributed ("i.i.d.") complex Gaussian distribution with $\mathcal{C}\mathcal{N}(0,1)$;
$s_k = [s_{k,1} \ldots s_{k,N_t}] \in \mathbb{C}^{N_t \times 1}$ as the transmitted symbol vector satisfying $E[s_k s_k^H] = E_s I_{N_t}$ with uniform power allocation across the transmission antennas; and
$w_k$ denotes the additive white Gaussian noise (AWGN) vector with zero mean and covariance matrix $E[w_k w_k] = N_0 I_{N_r} = \sigma_n^2 I_{N_r}$.

Assuming the channel is an imperfect channel, an estimation method such as least-square estimator or MMSE can allow for channel estimation error to be represented as an additional noise term:

$$y_k = H_k s_k + w_k = \hat{H}_k s_k + |H_k - \hat{H}_k| \cdot s_k + w_k = \hat{H}_k s_k + \hat{w}_k \qquad (2)$$

where:
$\hat{H}_k$ is an estimated channel matrix; and
$\hat{w}_k$ is a noise vector with noise variance of channel estimation error plus AWGN noise variance, such that $\sigma_e^2 + \sigma_n^2$ when $\sigma_e^2$ is noise variance of an estimation error and $\sigma_n^2$ is Gaussian noise variance.

Then, assuming a SISO system, calculation of SINR $\lambda_k$ for k-th subcarrier is given by:

$$\lambda_k = \frac{|\hat{h}_k|^2}{\sigma_e^2 + \sigma_n^2} \qquad (3)$$

where:
$\sigma_e^2$ is the noise variance of estimation error;
$\sigma_n^2$ is the Gaussian noise variance; and
$\hat{h}_k$ is the channel value for k subcarrier such as measured voltage at a certain frequency, such as at a pilot/subcarrier's frequency.

In order to accurately predict Packet Error Rate (PER) performance through the calculated SINR value $\lambda_k$, an effective SINR value can be computed using a Received Bit mutual Information Rate (RBIR) approach. For all M-ary modulated symbols on each subcarrier, symbol-level mutual information can be calculated and then an effective SINR can be achieved by de-mapping average mutual information to the effective SINR. An Effective SINR Mapping (ESM) function of RBIR algorithm is given by:

$$\Phi(SINR; M) = \log_2 M - \frac{1}{M}\sum_{m=1}^{M} E_U\left\{\log_2\left(\sum_{k=1}^{M}\exp[|U|^2 - |\sqrt{SINR}(s_k - s_m) + U|^2]\right)\right\} \quad (4)$$

where:
 M is a number of constellation points for the MCS;
 U is a complex Gaussian random variable with zero mean and variance of 1; and
 $s_k$ is the constellation point with normalized energy.

Figure 4:
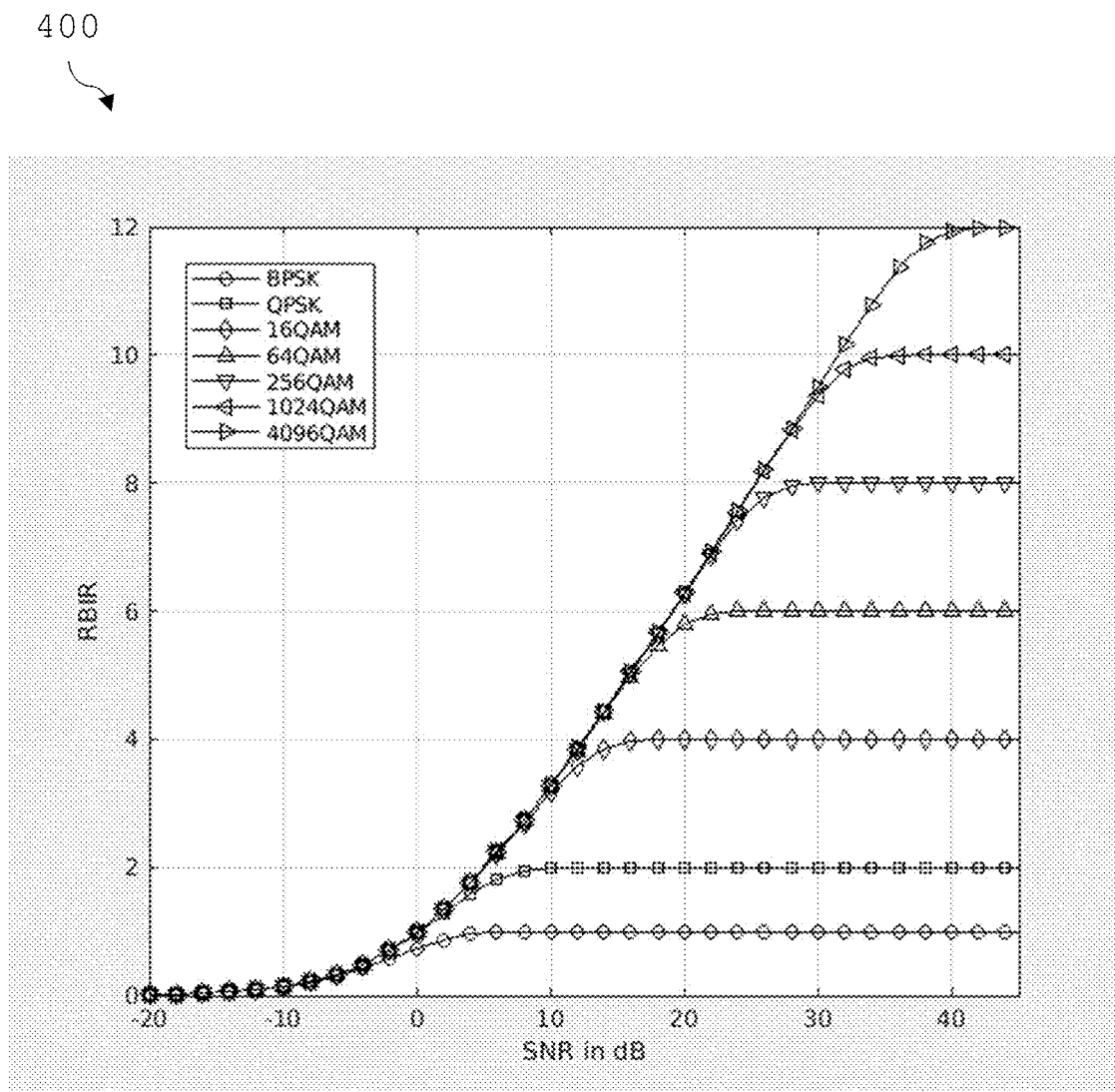
FIG. 4 is a diagram illustrating RBIR ESM curves for RBIR value versus input SINR value in accordance with some embodiments of the present disclosure.

FIG. 4 shows simulated RBIR ESM results for various modulation orders, based on equation (4). To elaborate, FIG. 4 is a diagram 400 illustrating RBIR ESM curves for RBIR value versus input SINR value in accordance with some embodiments of the present disclosure. As shown in the example embodiment, diagram 400 can include RBIR in bits shown on a y-axis and SNR in decibels (dB) can be shown on an x-axis. Each modulation scheme can start around −20 dB at 0 bits and follow similar curves until about −5 dB. BPSK (represented in FIG. 4 by the curve with circular data points) that levels off at 1 bit at about 5 dB. QPSK (represented in FIG. 4 by the curve with square data points) levels off at 2 bits at about 10 dB. 16QAM (represented in FIG. 4 by the curve with diamond data points) levels off at 4 bits at about 15 dB. 64QAM (represented in FIG. 4 by the curve with the upward pointing triangle data points) levels off at 6 bits at more than 20 dB. 256QAM (represented in FIG. 4 by the curve with the downward pointing triangle data points) levels off at 8 bits at about 30 dB. 1024QAM (represented in FIG. 4 by the curve with the leftward pointing triangle data points) levels off at 10 bits at about 35 dB. 4096QAM (represented in FIG. 4 by the curve with the rightward pointing triangle data points) levels off at 12 bits at about 40 dB. See FIG. 10 and its associated description for further details.

In various embodiments a processor can calculate an average RBIR by mapping per-subcarrier SINR value into equation (4) as:

$$RBIR = \frac{1}{N \cdot T \cdot N_{ss}}\sum_{i_{ss}=1}^{N_{ss}}\sum_{t=1}^{T}\sum_{n=1}^{N}\Phi(SINR(i_{ss}, n, t); M) \quad (5)$$

where:
 N is the number of subcarriers;
 T is the number of OFDM symbols; and
 $N_{ss}$ is the number of spatial streams.

Once an average RBIR value is determined, an effective SINR can be obtained by inversely mapping each M-QAM according to:

$$\lambda_{eff} = \alpha \cdot \Phi^{-1}(RBIR; M) \quad (6)$$

where: $\alpha$ represents a calibration factor that accounts for channel estimation error.

Calibration factor $\alpha$ can be calculated by comparing PER performances over the AWGN channel. Such calculation of $\alpha$ can be modeled as:

$$\alpha = \arg\min_{\alpha}|PER(\lambda_{awgn}) - PER(\lambda_{eff}(\alpha))| \quad (7)$$

where:
 $PER(\lambda_{awgn})$ is PER performance over AWGN channel with $\lambda_{awgn}$ as SNR value; and
 $PER(\lambda_{eff}(\alpha))$ is PER performance with an effective SINR of calibration factor) $\lambda_{eff}(\alpha)$.

In various embodiments where the innovation described herein is employed in accordance with 802.11 standards, Table 1 below shows a list of numerically optimal values of $\alpha$ over a representative 10 different MCS levels (e.g. 0, 1, 2, 3, 4, 5, 6, 7, 8, 9) of Binary Convolutional Codes (BCC).

TABLE 1

Optimal values of α for different MCS levels

| MCS level at 20 MHz bandwidth | Code rate $R_{c,i}$ | Modulation $M_i$ | Calibration factor α |
|---|---|---|---|
| MCS 0 | 1/2 | BPSK | 1.32 |
| MCS 1 | 1/2 | QPSK | 1.48 |
| MCS 2 | 3/4 | QPSK | 1.82 |
| MCS 3 | 1/2 | 16-QAM | 1.41 |
| MCS 4 | 3/4 | 16-QAM | 1.78 |
| MCS 5 | 2/3 | 64-QAM | 1.57 |
| MCS 6 | 3/4 | 64-QAM | 1.71 |
| MCS 7 | 5/6 | 64-QAM | 1.91 |
| MCS 8 | 3/4 | 256-QAM | 1.66 |
| MCS 9 | 5/6 | 256-QAM | 1.82 |

RBIR Mapping for MIMO System—Channel Orthogonality Ratio

In order to effectively calculate SINR for MIMO-OFDM systems with multiple spatial streams, both optimization parameters for channel realization are employed, namely, calibration factor $\alpha$ and channel orthogonality ratio $R_{co}$. To design the MIMO detector with near-MLD performance, a MIMO-MLD performance boundary can be predicted using MMSE and genie-aided interference-free (IF) receiver calculations. Using MMSE and ZF equalizers as linear equalizers provides an advantage by allowing for easy calculation of SNR or SINR values. This is accomplished by considering an output signal of the receiver as approximated a system with multiple single-antennas. However, linear equalizers also suffer a disadvantage because they suffer from a relatively higher error detection rate as compared to MLD. Since a MMSE detector provides relatively better performance than a ZF detector in terms of error detection, a MMSE detector can be advantageously used to define the lower bound of MLD performance. In light of these considerations, $D_k$ can denotes a MMSE filter equation for k-th subcarrier as:

$$D_k^H = [d_{k,1}\ d_{k,2}\ \ldots\ d_{k,N_t}] = \left(H_k^H H_k + \frac{1}{\sigma_n^2}I_{N_t}\right)^{-1}H_k^H \quad (8)$$

where:
 $d_{k,m}$ is the column vector of $D_k$; and
 $[\bullet]^H$ is the transpose conjugate of matrix.

The output signal for the j-th stream at the k-th subcarrier for a MMSE filter can be calculated by applying $D_k^H$ to the received signal vector $y_k$ of equation (1). A corresponding SINR can be represented as follows:

$$\lambda_{k,j}^{mmse} = \frac{1}{\left[\left(\left(\frac{1}{\sigma_n^2}\right)H_k^H H_k + I_{N_t}\right)^{-1}\right]_{j,j}} - 1 \quad (9)$$

In order to define an upper bound of MLD performance, interference among data symbols is assumed to be perfectly eliminated at the receiver. This is referred to as interference free (IF) receiver. A post-MLD SINR can be upper-bounded by such a genie-aided IF receiver. Accordingly, a corresponding SINR for the j-th stream at the k-th subcarrier can be represented as:

$$\lambda_{k,j}^{if} = \frac{\|h_{k,j}\|^2}{\sigma_n^2} \qquad (10)$$

where $h_{k,m}$ is the m-th column vector of $H_k$. Equation (10) is calculated when $h_{k,m}{}^H h_{k,j}=0$ is satisfied for all $j \neq m$.

Using equations (9) and (10), a near-MLD SINR can be lower-and-upper bounded as follows:

$$\lambda_{k,j}^{mmse} \leq \lambda_{k,j}^{mid} \leq \lambda_{k,j}^{if} \qquad (11)$$

Additionally, function F can be utilized as a different metric using SINR, such as channel capacity (i.e., $\mathcal{F}(\lambda)=\log_2(1+\lambda)$). A channel capacity equation utilizing function $\mathcal{F}$ will result in relationship (11) to be replaced as:

$$\mathcal{F}(\lambda_{k,j}^{mmse}) \leq \mathcal{F}(\lambda_{k,j}^{mid}) \leq \mathcal{F}(\lambda_{k,j}^{if}) \qquad (12)$$

Rearranging (12) allows for transformation to $\mathcal{F}(\lambda_{k,j}^{mid})= \mathcal{F}(\lambda_{k,j}^{mmse})+\beta \cdot (\mathcal{F}(\lambda_{k,j}^{if})-\mathcal{F}(\lambda_{k,j}^{mmse}))$. Consequently, a SINR of near-MLD $\lambda_{k,j}^{mid}$ can be represented as $$\lambda_{k,j}^{mid}=(1+\lambda_{k,j}^{mmse})^{(1-\beta)}(1+\lambda_{k,j}^{if})^{\beta}-1. \qquad (13)$$

MIMO channel characteristics are utilized to define the parameter $\beta$. A 2 by 2 MIMO-OFDM system can be used to provide simplicity for modeling herein.

FIG. 2 is a concept of MIMO system. When employing a system such as the one represented by FIG. 2, a transmitted signal and interference signal may be received simultaneously at antennas 208a and 208b of receiver unit 206. Due to the interference, a channel imbalance may occur whereby an eigen-value of the channel matrix may become quite unbalanced and result in throughput loss. Assuming an ideally spatial multiplexed MIMO channel, a 2 by 2 MIMO channel can be approximated as a combination of multiple 1 by 2 SIMO channels, since eigen-values or singular values of each channel approach a value of one. Each of the signals received at receiver antennas 208a, 208b can be represented according to a channel matrix power as $\sqrt{|h_{11}|^2+|h_{21}|^2}$ and $\sqrt{|h_{12}|^2+|h_{22}|^2}$, respectively. The ratio of channel orthogonality can be defined according to the channel relationship as:

$$R_{co} = \frac{\det(H_k^H H_k)}{\operatorname{trace}(H_k^H H_k)} = \frac{\det(H_k^H H_k)}{\|H_k\|_F^2}, \quad 0 \leq R_{co} \leq 1 \qquad (14)$$

where: trace( ) represents the sum of matrix's diagonal elements, and det( ) represents determinant. $\|\cdot\|_F$ is Frobenius matrix norm. The determinant of $H_k^H H_k$ indirectly shows how much influence the interference signal has on the channel when separated as a 1 by 2 SIMO channel. When normalizing the determinant by the Frobenius norm, $R_{co}$ can be expressed as a ratio of channel orthogonality that is limited from 0 to 1. The assumption when $R_{co} \approx 1$ is that a MIMO channel can be ideally split into multiple orthogonal SISO channels. Then, a SINR value of MLD $\lambda_{k,j}^{mid}$ approaches a SINR value of IF receiver $\lambda_{k,j}^{if}$ due to $\lambda_{k,j}^{mmse} \approx \lambda_{k,j}^{if}$;

On the other hand, an assumption when $R_{co} \approx 0$ is that the channel is totally interrupted and unbalanced. A MLD SINR $\lambda_{k,j}^{mid}$ approaches a MMSE SINR $\lambda_{k,j}^{mmse}$ due to $\lambda_{k,j}^{mmse} << \lambda_{k,j}^{if}$. By applying parameter $R_{co}$ as $\beta$ in equation (13) above, a post-MLD SINR value can be calculated as:

$$\lambda_{k,j}^{mid}=(1+\lambda_{k,j}^{mmse})^{(1-R_{co})}(1+\lambda_{k,j}^{if})^{R_{co}}-1 \qquad (15)$$

A MLD SINR from equation (15) can be applied in accordance with to equations (5) and (6), such that the effective SINR on a MIMO channel can be calculated. Calibration factor $\alpha$ of MIMO channel can thereby be approximated as equivalent to $\alpha$ of a SISO channel.

Finally, a calculated effective SINR $\lambda_{eff}$ can be mapped to PER performance on AWGN. This allows for PER performance prediction on an AWGN by applying the effective SINR value for each MCS level. PER prediction for PL equation is as follows:

$$PER_{PL} = 1 - \left(1 - PER_{PL_{ref}}(\lambda_{eff})\right)^{PL/PL_{ref}} \qquad (16)$$

where:
packet length as a reference on AWGN PER curves is denoted as $PL_{ref}$; and
packet length on the transmission is denoted as PL.

In various embodiments $PER_{PL_{ref}}(\lambda_{eff})$ depends on MCS. $PER_{PL_{ref}}(\lambda_{eff})$ can be obtained by using a look-up table for MCS and SINR (e.g. see FIGS. 5-6 and associated description herein).

In order to estimate a PER for a transmission, the following representation can be applied:

$PER_{PL_{ref}}(\lambda_{eff})=PER\_LUT(\lambda_{eff};MCS,$coding scheme, reference packet length)

$$\text{Reference packet length } PL_{ref} = \begin{cases} 32 \text{ bytes, } BCC \text{ and} \\ \quad PL < 400 \text{ bytes} \\ 1458 \text{ bytes, } BCC \text{ and} \\ \quad PL \geq 400 \text{ bytes} \\ 1458 \text{ bytes, } LDPC \end{cases}$$

where:
PER performance for a particular reference packet length $PL_{ref}$ on AWGN;
RBIR ESM values versus input SINR; and
calibration factors are saved in look-up tables.

In addition, to apply AMC scheme an expected throughput for i-th MCS level $R_{thr,i}$ can be calculated using $PER_{PL}$ obtained from equation (16) as:

$$R_{thr,i}=(1-PER_{PL,i}) \cdot N_{ss} \cdot R_{c,i} \cdot \log_2 M_i \text{bps/Hz} \qquad (17)$$

where:
$PER_{PL,i}$ is an expected PER performance;
$R_{c,i}$ is a channel coding rate; and
$M_i$ is a modulation order for the i-th MCS level.

A processor of a receiver employing the innovation herein can select a MCS level with a largest data rate from equation (17) and can recommend and/or otherwise implement it at an upper layer stack for link adaptation.

Selection of a MCS can occur according to:

$$\text{Select } MCS^* = \arg\max_{\{mcs=0,\ldots,9\}} R(mcs) \qquad (18)$$

where:
R(mcs)=PER*rate(MCS); and
rate(MCS)=$R_{thr,i}$

In various embodiments, Table 2 illustrates required SNR values per MCS with $PL_{ref}$ 4096 bytes at PER 10% for various channel models. Table 1 and 2 are examples of optimization parameters for a MIMO-OFDM system, and different values may be set and/or used according to configuration of a particular system.

TABLE 2 required SINR values for MCS level and number of spatial streams

| | | 1ss | | | | | 2ss | | | | |
|---|---|---|---|---|---|---|---|---|---|---|---|
| MCS | AWGN | TGnB | TGnC | TGnD | TGnE | TGnF | TGnB | TGnC | TGnD | TGnE | TGnF |
| 0 | 3.69 | 6.76 | 6.91 | 7.26 | 7.31 | 7.16 | 7.44 | 7.94 | 7.90 | 7.86 | 7.79 |
| 1 | 7.04 | 9.79 | 9.97 | 10.24 | 10.26 | 10.08 | 10.76 | 10.85 | 10.82 | 10.83 | 10.8 |
| 2 | 9.47 | 15.47 | 15.72 | 15.69 | 15.52 | 15.43 | 14.35 | 14.58 | 14.61 | 14.63 | 14.58 |
| 3 | 12.92 | 15.40 | 15.64 | 15.82 | 15.87 | 15.81 | 17.91 | 17.86 | 17.82 | 17.71 | 17.62 |
| 4 | 16.03 | 21.18 | 21.60 | 21.50 | 21.40 | 21.39 | 21.72 | 21.78 | 21.81 | 21.78 | 21.75 |
| 5 | 20.48 | 23.72 | 24.00 | 24.28 | 24.36 | 24.27 | 26.97 | 27.09 | 27.07 | 26.95 | 26.96 |
| 6 | 21.94 | 26.28 | 26.66 | 26.81 | 26.84 | 26.77 | 29.50 | 29.31 | 29.28 | 28.99 | 28.97 |
| 7 | 23.29 | 28.24 | 28.98 | 29.38 | 29.63 | 29.76 | 30.70 | 30.75 | 31.06 | 31.28 | 31.39 |
| 8 | 27.43 | 31.03 | 31.66 | 31.82 | 31.83 | 31.79 | 34.94 | 35.12 | 34.99 | 35.17 | 35.01 |
| 9 | 28.94 | 34.15 | 34.56 | 34.68 | 34.80 | 34.89 | 36.79 | 36.90 | 36.99 | 37.09 | 37.18 |

Figure 5:
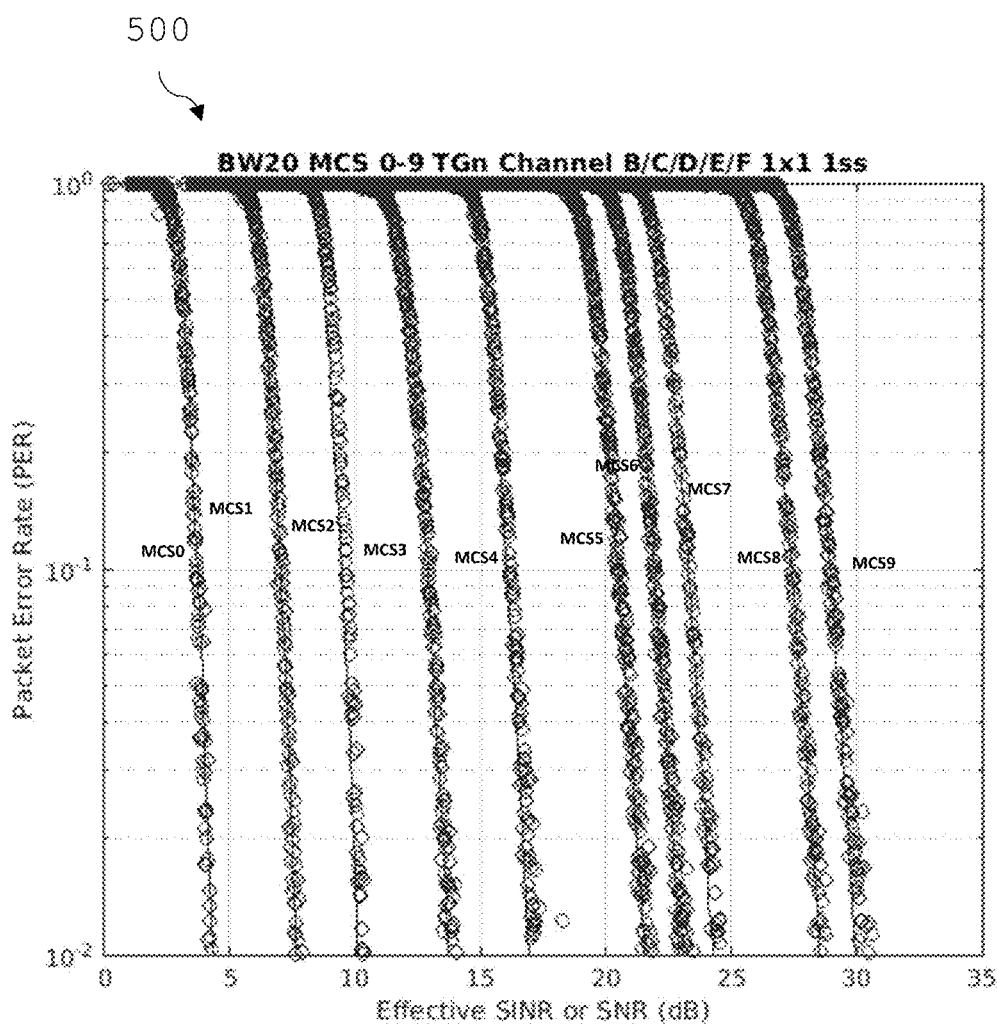
FIG. 5 is a diagram illustrating simulation results of a RBIR ESM fitting performance versus AWGN PER curves for a 1 by 1 SISO system for various channel models in accordance with some embodiments of the present disclosure.
Figure 6:
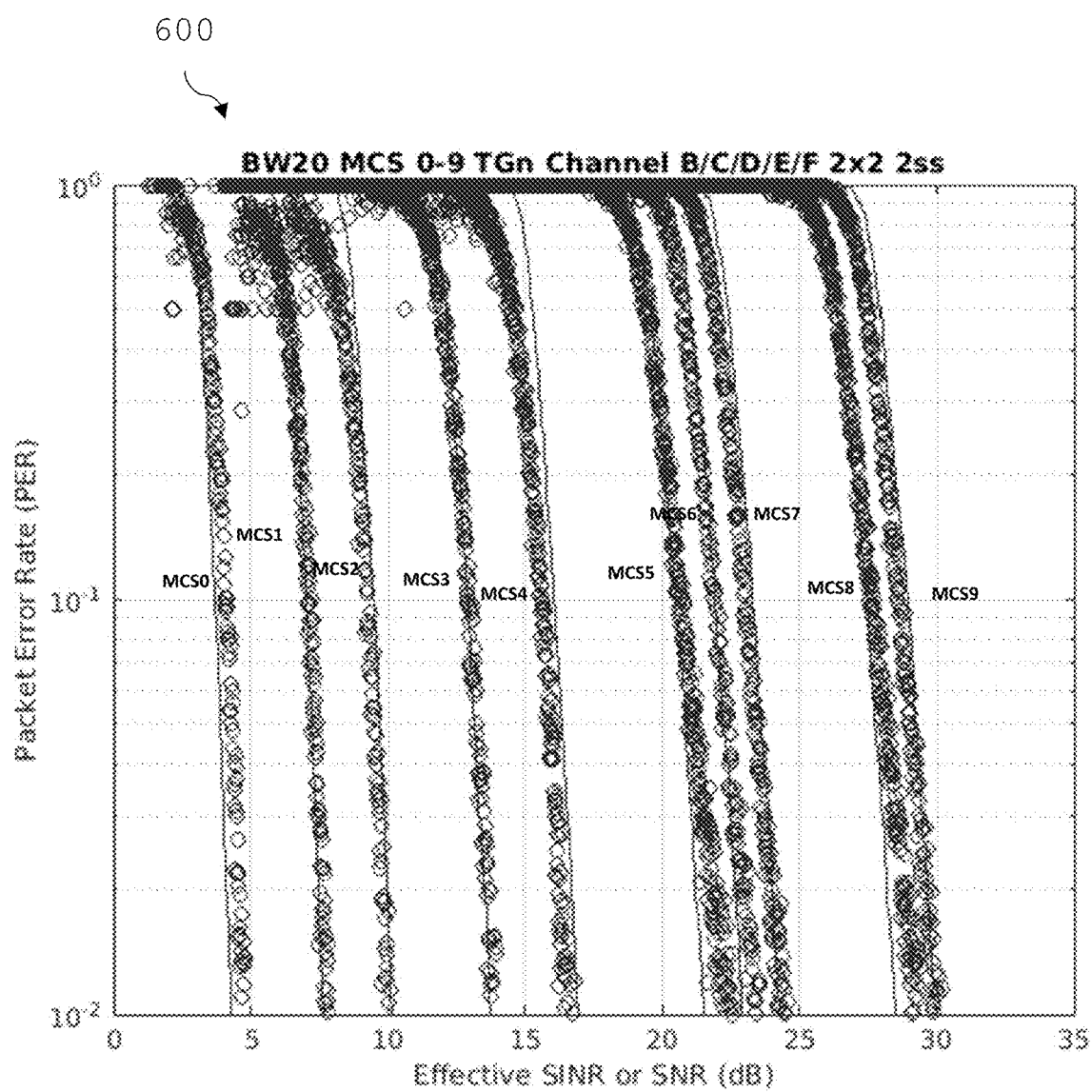
FIG. 6 is a diagram illustrating simulation results of a RBIR ESM fitting performance versus AWGN PER curves of a 2 by 2 MIMO system various channel models in accordance with some embodiments of the present disclosure.

FIGS. 5-6 show that performance of proposed effective SINR mapping algorithms are precisely assigned according to AWGN reference PERs although PER performance of each channel model can be different. By applying the proposed parameters herein to MIMO-MLD calculations, proposed ESM schemes provide novel prediction accuracy.

To elaborate, FIG. 5 is a diagram 500 illustrating simulation results of a RBIR ESM fitting performance versus AWGN PER curves for a 1 by 1 SISO system for various channel models in accordance with some embodiments of the present disclosure.

FIG. 6 is a diagram 600 simulation results of a RBIR ESM fitting performance versus AWGN PER curves of a 2 by 2 MIMO system various channel models in accordance with some embodiments of the present disclosure. In FIG. 6, calibration factor α for a channel estimation error can be used regardless of the number of streams, which may have different values depending on the system configuration. However proposed MIMO-MLD SINR calculation methods may have an error range within 0.3 dB, indicating that the proposed methods are applicable and valid for all system configurations.

Figure 7:
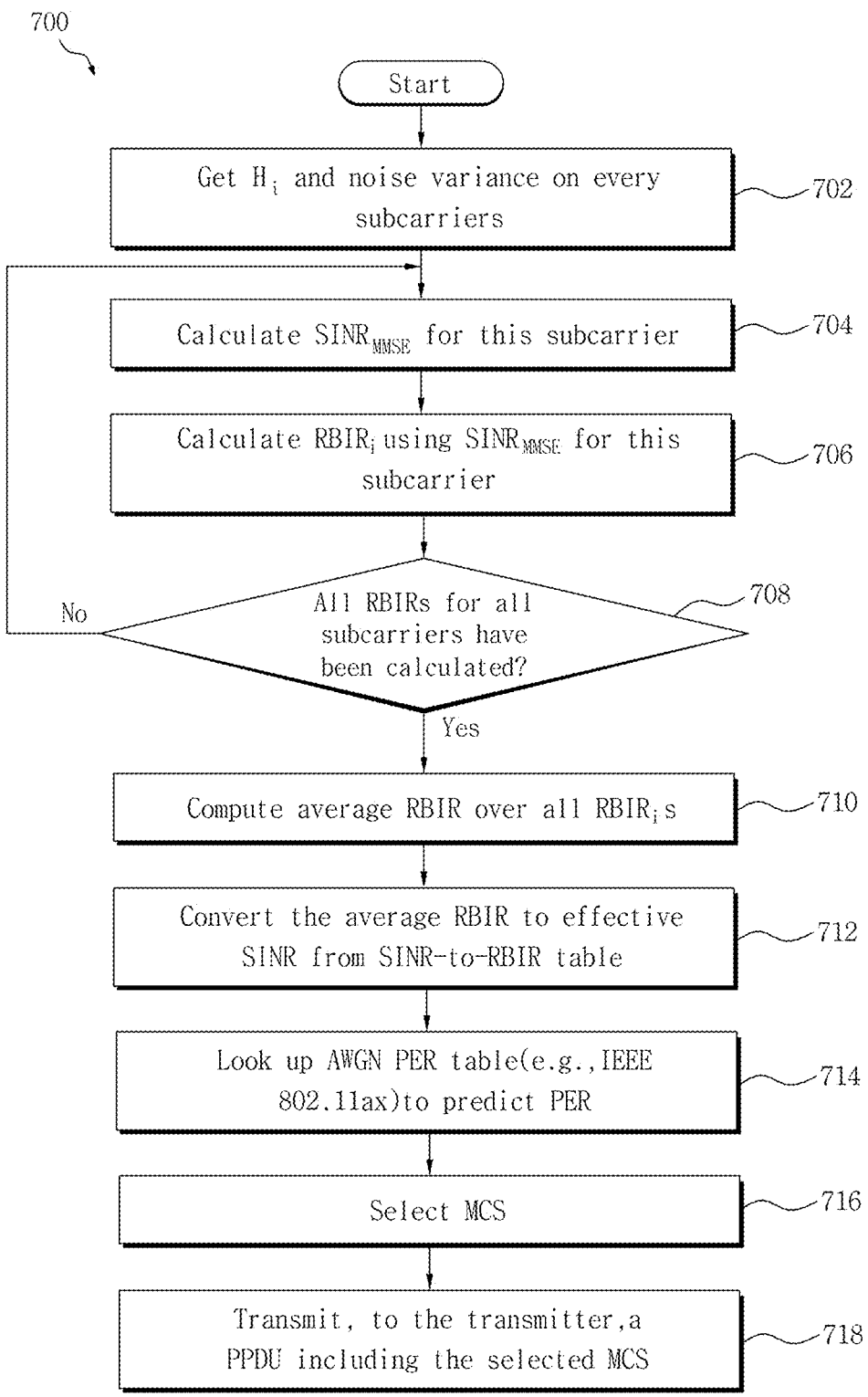
FIG. 7 is a flow chart diagram illustrating a SINR calculation method in accordance with some embodiments of the present disclosure.

FIG. 7 is flow chart diagram 700 illustrating a SINR calculation method in accordance with some embodiments of the present disclosure. In some embodiments, such method can include a number of operations that can be performed by the at least one processor 304. In some embodiments, such method can include a number of operations that are performed according to instructions stored in memory that can be executed and/or otherwise performed by the at least one processor 304.

As shown in the example embodiment, such method can include operation 702, which includes getting or acquiring the channel estimation H; and noise variance on each and every subcarrier of a set of subcarriers. In some embodiments this can be accomplished by measuring values. Next, in operation 704, the processor 304 can calculate a $SINR_{MMSE}$ for a subcarrier (e.g. this can be calculated according to equation (3) herein). In operation 706 the processor 304 can calculate $RBIR_i$ using the $SINR_{MMSE}$ for the subcarrier (e.g. this can be calculated according to equation (4) herein). In operation 708 the processor 304 can determine if the RBIRs for all subcarriers of the set of subcarriers have been calculated. If all RBIRs for all subcarriers have not been calculated, the processor 304 can return and perform operation 704 and 706 for the next subcarrier of the set of subcarriers before repeating operation 708. Otherwise, if all RBIRs for all subcarriers have been calculated, the processor 304 can proceed to perform operation 710 that includes computing an average RBIR over all RBIRs (e.g. this can be calculated according to equation (5) herein). Next, in operation 712 the processor 304 can convert the average RBIR to an effective SINR (e.g. this can be calculated according to equation (6) herein). In some embodiments this is performed according to a SINR-to-RBIR table. In operation 714 the processor 304 can perform a look up via an AWGN PER table (e.g. IEEE 802.11ax) to predict PER. For example, FIGS. 5 and 6 shows relations between effective SINRs and PERs depending on MCS for the AWGN PER table. In operation 716 the processor 304 can select an MCS. Finally, in operation 718 the processor can transmit a PPDU including the selected MCS to the transmitter.

Figure 8:
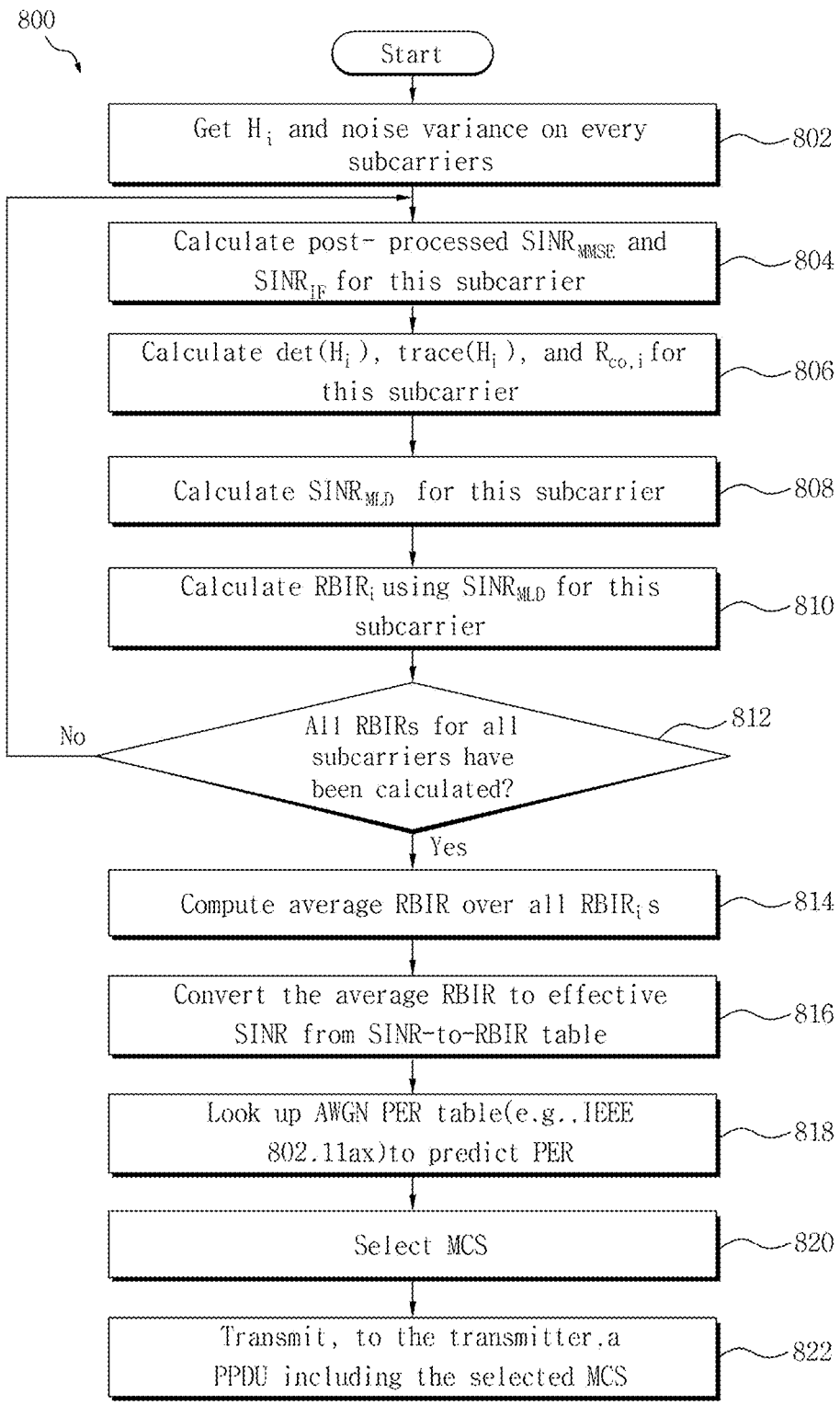
FIG. 8 is a flow chart diagram illustrating a near-MLD SINR calculation method based on RBIR ESM in MIMO-OFDM system in accordance with some embodiments of the present disclosure.

FIG. 8 is a flow chart diagram 800 illustrating a near-MLD SINR calculation method based on RBIR ESM in MIMO-OFDM systems. In some embodiments, such method can include a number of operations that can be performed by the at least one processor 304. In some embodiments, such method can include a number of operations that are performed according to instructions stored in memory that can be executed and/or otherwise performed by at least one processor.

As shown in the example embodiment, such method can include operation 802, which includes getting or acquiring the channel estimation H; and noise variance a on each and every subcarrier of a set of subcarriers. Next, in operation 804, the processor 304 can calculate a post-processed $SINR_{MMSE}$ and $SINR_{IF}$ for a subcarrier (e.g. these can be calculated according to equations (9) and (10) herein). In operation 806 the processor 304 can calculate det($H_i$), trace($H_i$), and $R_{co,i}$ for the subcarrier (e.g. this can be calculated according to equation (14) herein). In operation 808 the processor 304 can calculate $SINR_{MLD}$ for the subcarrier (e.g. this can be calculated according to equation (15) herein). Then, in operation 810 the processor 304 can calculate RBIR; using the $SINR_{MLD}$ for the subcarrier. This can include obtaining the RBIR corresponding SINR using a look up table between SINR values and RBIR values as shown in FIG. 4. In operation 812 the processor 304 can determine if the RBIRs for all subcarriers of the set of subcarriers have been calculated. If all RBIRs for all subcarriers have not been calculated, the processor 304 can return and perform operation 804, 806, 808, and 810 for the next subcarrier of the set of subcarriers before repeating operation 812. Otherwise, if all RBIRs for all subcarriers have been calculated, the processor 304 can proceed to perform operation 814 that includes computing an average RBIR over all RBIRs (e.g. this can be calculated according to equation (5) herein). Next, in operation 816 the processor 304 can convert the average RBIR to an effective SINR (e.g. this can be calculated according to equation (6) herein). In some embodiment this is performed according to a SINR-to-RBIR table. In operation 818 the processor 304 can perform a look up via an AWGN PER table (e.g. IEEE 802.11ax) to predict PER (e.g. this can be calculated according to equation (16) herein). In operation 820 the processor 304 can select a MCS (e.g. this can be performed according to equation (18) herein). Finally, in operation 822 the processor 304 can transmit a physical layer protocol data unit (PPDU) including the selected MCS to the transmitter.

Figure 9:
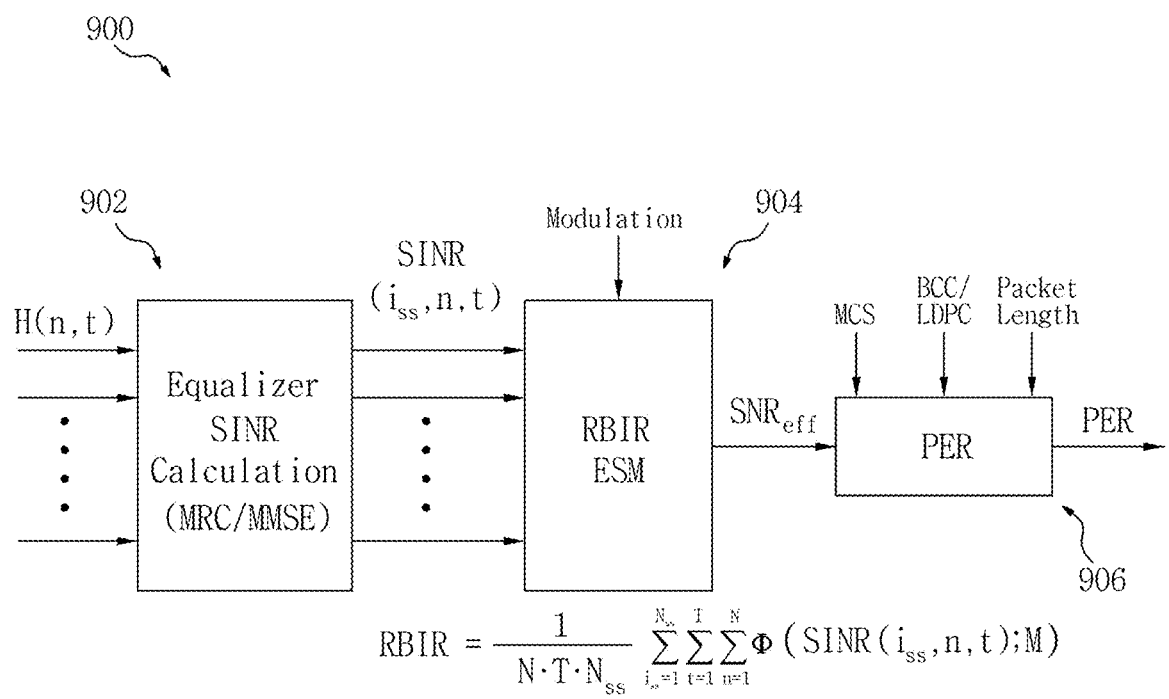
FIG. 9 is a block diagram illustrating processor functioning in accordance with some embodiments of the present disclosure.

FIG. 9 is a block diagram 900 illustrating processor functioning in accordance with some embodiments of the present disclosure. As shown in the example embodiment, the processor 304 can include an Equalizer SINR Calculation module 902 for MRC/MMSE, a RBIR ESM module 904, and a PER module 906. Initially at least one $H_{(n,t)}$ can be an input to module 902. Equations 9, 10, 14, and/or 15 can be performed by module 902 in various embodiments. Obtaining a RBIR using a SINR-to-RBIR lookup table can also be performed by module 902. At least one SINR($i_{ss}$, n, t) can be output(s) from module 902 and received as input(s) to module 904. Equations 5 and/or 6 can be performed by module 904 in various embodiments, in accordance with a modulation input. A $SNR_{eff}$ output of module 904 can be received as input at module 906. MCS, BCC/LDPC, Packet Length, and/or others can be additional inputs to PER module 906, which can perform at least equation 16. Module 906 can then output PER.

Figure 10:
FIG. 10 is a table illustrating RBIR values for various modulation schemes at different SNR's in dB.

FIG. 10 is a table 1000 illustrating RBIR values for various modulation schemes at different SNR's in dB. As shown, the various modulation schemes shown include BPSK, QPSK, 16QAM, 64QAM, 256QAM, 1024QAM, and 4096QAM. RBIR values for each of the schemes at SNR values ranging from −20 dB to 46 dB are shown in table 1000 and correspond to the various curves represented and discussed with respect to FIG. 4.

It is contemplated that any optional feature of the inventive variations described may be set forth and claimed independently, or in combination with any one or more of the features described herein. It is further noted that the claims may be drafted to exclude any optional element for an embodiment. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

In addition, the effects that can be obtained or predicted by embodiments of the present disclosure have been disclosed directly or implicitly in the detailed description of the embodiments of the present disclosure. For example, various effects predicted according to the embodiments of the present disclosure have been disclosed in the above-described detailed description.

The embodiments described herein and the claims thereto are directed to patent eligible subject matter. These embodiments do not constitute abstract ideas for a myriad of reasons. One such reason is that any claims provide for the ability to calculate near maximum likelihood detection performance capability signal to interference plus noise ratio. These apparatuses and computer implemented methods allow for improved communications in MIMO-OFDM and other wireless systems and thereby constitute an improvement to the functioning of the computer itself, which may otherwise fail to run at peak efficiency, and thus qualifies as "significantly more" than an abstract idea.

Other aspects, advantages, and prominent features of the present disclosure will become apparent to those skilled in the art from the above detailed description which discloses various embodiments of the present disclosure taken in conjunction with the accompanying drawings.

The above description is merely illustrative of the technical idea of the present embodiments, and various modifications and changes may be made without departing from the essential characteristics of the present embodiments by those skilled in the art to which these embodiments belong. Accordingly, the present embodiments are intended to describe rather than limit the technical idea of the present embodiments, and the scope of the technical idea of the present embodiments is not limited thereto. The protection scope of the present embodiments should be interpreted according to the following claims, and all technical ideas within the scope equivalent thereto should be interpreted as being included in the scope of the present embodiments.

What is claimed is:

1. A wireless station device, comprising:
   a transceiver configured to receive a signal from another station device; and
   a processor operably coupled to the transceiver, the processor configured to:
     acquire a channel estimation from the received signal;
     calculate a first signal to interference plus noise ratio (SINR) based on the channel estimation;
     calculate a second SINR based on the channel estimation;
     calculate a third SINR based on the first SINR and the second SINR;
     calculate a received bit mutual information rate (RBIR) based on the third SINR; and
     select a modulation and coding scheme (MCS) based on the RBIR; and
   wherein the transceiver is further configured to transmit to the another station device, the selected MCS.

2. The wireless station device of claim 1, wherein the first SINR is a lower bound of the third SINR, and the second SINR is an upper bound of the third SINR.

3. The wireless station device of claim 1, wherein the processor is further configured to:
   calculate a ratio of channel orthogonality based on the channel estimation; and
   calculate the third SINR based on the first SINR, the second SINR and the ratio of channel orthogonality.

4. The wireless station device of claim 3, wherein ratio of channel orthogonality is less than or equal to 1.

5. The wireless station device of claim 3, wherein ratio of channel orthogonality represents how much an interference signal affects a channel.

6. The wireless station device of claim 1, wherein the processor is further configured to compute an average RBIR over a set of subcarriers, and select the MCS based on the average RBIR.

7. The wireless station device of claim 1, wherein the first SINR is a SINR for a minimum mean square error (MMSE) receiver and the second SINR is a SINR for an interference-free (IF) receiver.

8. The wireless station device of claim 1, wherein the processor is further configured to calculate the RBIR based on the third SINR by using a look-up table.

9. The wireless station device of claim 6, wherein the processor is further configured to convert the average RBIR to a fourth SINR using a SINR-to-RBIR table, and select the MCS based on the fourth SINR.

10. The wireless station device of claim 9, wherein the processor is further configured to:
look up an additive white Guassian noise (AWGN) packet error rate (PER) table based on the fourth SINR to predict a PER and select the MCS based on the predicted PER.

11. A method for wireless communication performed by a wireless station device, the method comprising:
receiving a signal from another station device;
acquiring a channel estimation from the received signal;
calculating a first signal to interference plus noise ratio (SINR) based on the channel estimation;
calculating a second SINR based on the channel estimation;
calculating a third SINR based on the first SINR and the second SINR;
calculating a received bit mutual information rate (RBIR) based on the third SINR; and
selecting a modulation and coding scheme (MCS) based on the RBIR, and
transmitting to the another station device, the selected MCS.

12. The method of claim 11, wherein the first SINR is a lower bound of the third SINR, and the second SINR is an upper bound of the third SINR.

13. The method of claim 11, further comprising:
calculating a ratio of channel orthogonality based on the channel estimation,
wherein calculating the third SINR comprises:
calculating the third SINR based on the first SINR, the second SINR and the ratio of channel orthogonality.

14. The method of claim 13, wherein the ratio of channel orthogonality is less than or equal to 1.

15. The method of claim 13, wherein the ratio of channel orthogonality represents how much an interference signal affects a channel.

16. The method of claim 11, further comprising:
computing an average RBIR over a set of subcarriers, and select the MCS based on the average RBIR.

17. The method of claim 11, wherein the first SINR is a SINR for a minimum mean square error (MMSE) receiver and the second SINR is a SINR for an interference-free (IF) receiver.

18. The method of claim 11, further comprising:
calculating the RBIR based on the third SINR by using a look-up table.

19. The method of claim 16, further comprising:
converting the average RBIR to a fourth SINR using a SINR-to-RBIR table; and
selecting the MCS based on the fourth SINR.

20. The method of claim 19, further comprising:
looking up an additive white Guassian noise (AWGN) packet error rate (PER) table based on the fourth SINR to predict a PER and select the MCS based on the predicted PER.

* * * * *